United States Patent [19]
Hubbard

[11] 3,802,721
[45] Apr. 9, 1974

[54] BICYCLE SEAT MOUNTING MEANS

[76] Inventor: John A. Hubbard, 1721 Manto St., Pascagoula, Miss. 39567

[22] Filed: July 3, 1972

[21] Appl. No.: 268,654

[52] U.S. Cl. ............................................. 280/287
[51] Int. Cl. ............................................. B62k 3/00
[58] Field of Search .................. 280/287, 289, 202; 248/393, 424; 297/346, 329, 334, 195

[56] References Cited
UNITED STATES PATENTS

| | | | |
|---|---|---|---|
| 3,136,524 | 6/1954 | Pickles | 248/424 |
| 3,279,821 | 10/1966 | Mennesson | 280/287 X |
| 3,623,749 | 11/1971 | Jensen | 280/287 X |
| 3,443,825 | 5/1969 | Wolf | 280/289 |

FOREIGN PATENTS OR APPLICATIONS

| | | | |
|---|---|---|---|
| 452,931 | 11/1949 | Italy | 280/289 |
| 481,050 | 3/1953 | Italy | 280/287 |
| 1,062,770 | 4/1954 | France | 280/287 |

*Primary Examiner*—Allen N. Knowles
*Assistant Examiner*—Gene A. Church
*Attorney, Agent, or Firm*—Schuyler, Birch, Swindler, McKie & Beckett

[57] ABSTRACT

A velocipede seat is mounted on a longitudinally movable carriage, which carriage is supported by pairs of parallel supports extending from pivotal attachments on either side of the carriage to pivotal attachments on brackets fixed to the velocipede frame. The parallel supports provide for substantially horizontal movement of the carriage. The carriage is controlled in its positioning by the releasable engagement of a carriage clamp and a horizontally extending frame member of the velocipede which acts as a guide. A manually operable handle for releasing the clamping means is provided to permit adjustment of the seat position.

6 Claims, 3 Drawing Figures

BICYCLE SEAT MOUNTING MEANS

BACKGROUND OF THE INVENTION

The present invention relates to means for mounting a seat on a velocipede.

The prior art has disclosed several means of adjustably mounting seats on velocipedes such as bicycles or tricycles. The most common such mounting means comprises a post extending from the vehicle seat downwardly and slightly forward into one of the tubes of the frame, which post is held in position by a clamp at the top of that frame tube. Another approach has been the clamping of the seat directly about a horizontal portion of the frame such that the seat is adjustable in a longitudinal direction. Each of these prior bicycle seat mounting means suffered inherent drawbacks. The use of the post providing substantially vertical adjustment required that the seat be raised to comfortably accommodate longer-legged riders, thus positioning the body of the rider and the resulting center of gravity of the vehicle-rider combination higher than is desirable and resulting in significantly less stable condition for taller riders. The clamping of a horizontally adjustable seat to a horizontal tube by means of a collar about the tube eliminated the undesirable change in the vertical position of the rider. However, such clamping of the seat tube tended to allow the seat to slide rotatably around the tube when a load was placed upon it. In many of these longitudinally adjustable seat mounting means, the seat was mounted directly to a frame member cantilevered from its point of attachment to other frame members. Thus the load imposed on this cantilevered member by the seat tended to fatigue and weaken the member. Furthermore, these prior art adjustable seat mounting means were held in position solely by a collar either fixed to the frame and clamping about the seat post or fixed to the seat and clamping about a frame member. Thus, to securely hold the seat in its predetermined position and prevent lateral rotation of the seat, it was necessary that the collar by clamped very tightly. With such tight clamping, it was very difficult for a person, especially a young person, to change the position of the seat without the use of tools.

SUMMARY OF THE INVENTION

This invention provides a velocipede seat mounting means that is stable against any rotation about a frame member and is easily adjustable by the rider and provides for adjustment of the seat in a direction substantially longitudinal with respect to the frame. The seat mounting means of this invention is also easily adjustable by hand and requires no tools to effect such adjustment.

Additionally, this seat mounting means provides for rearward positioning of the seat such that the center of gravity of the vehicle-rider combination may be moved sufficiently rearwardly to enable the rider easily to raise the front wheel of the velocipede off the ground and to perform other trick riding activities. This trick riding ability is highly desired by many youthful bicycle and tricycle riders.

Briefly, the invention contemplates velocipede seat mounting means wherein the seat is carried by a seat mounting carriage that is longitudinally movable with respect to the velocipede frame, which carriage is supported against vertical loads by support means pivotally attached to the carriage and to the frame. The carriage is guided in its longitudinal movement by a carriage guide which it engages and which is attached to the velocipede frame. A clamp with a manual release is attached to the carriage and engages the carriage guide such that the carriage may be releasably clamped in a preselected position along the guide. In a preferred embodiment the platform guide may be a horizontally extending tube of a bicycle frame, and the manual release may be a handle easily grasped and operated by a person wishing to change the position of the seat.

BRIEF DESCRIPTION OF THE DRAWINGS

The invention having been generally described, a specific embodiment, wherein the velocipede is a bicycle, will be discussed in detail with reference to the accompanying drawings in which.

DESCRIPTION OF AN ILLUSTRATIVE EMBODIMENT

Figure 1:
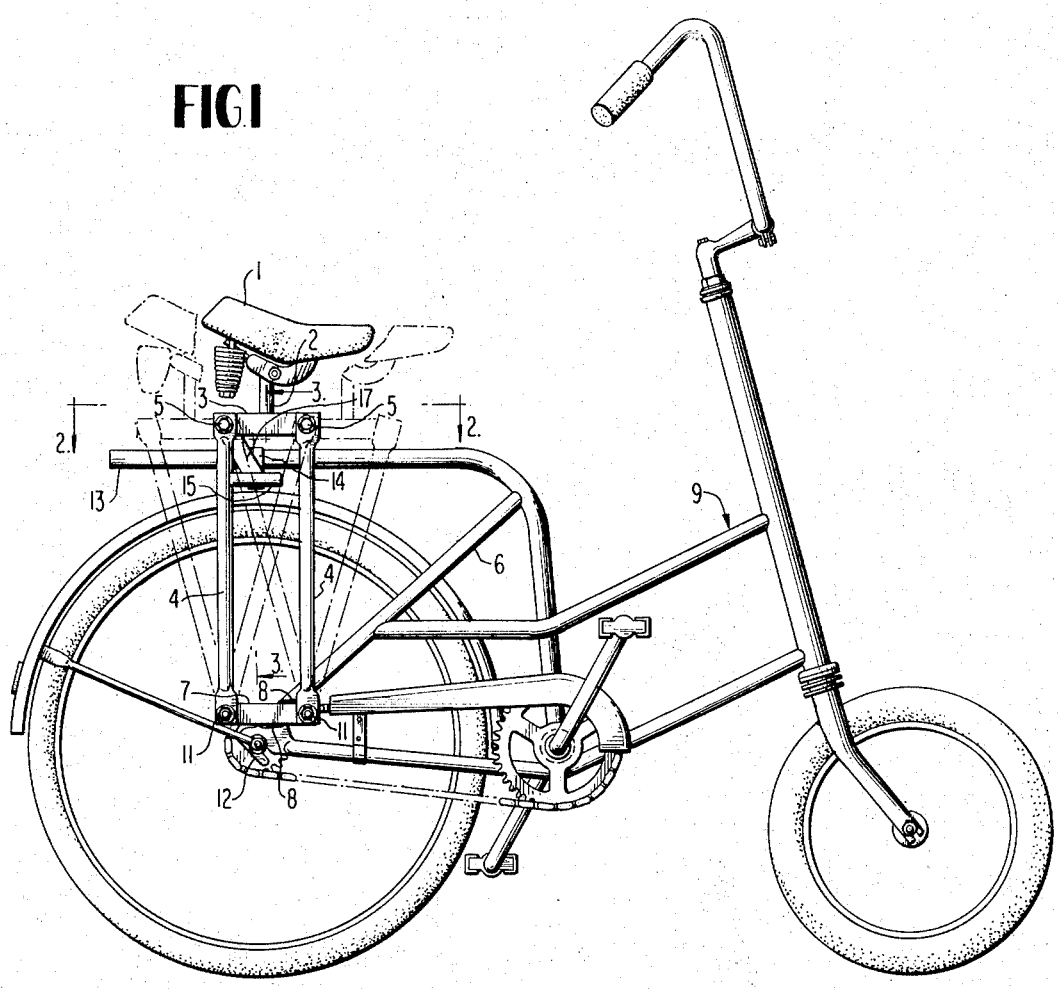
FIG. 1 is a side view of a bicycle incorporating the seat mounting means of this invention.
Figure 2:
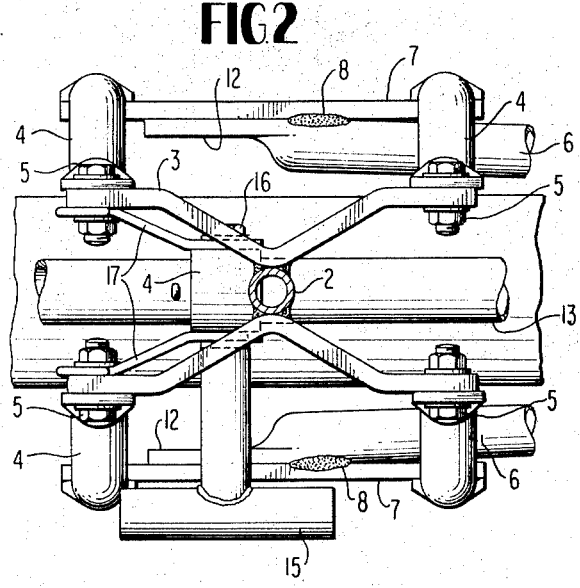
FIG. 2 is a top partial sectional view of the seat mounting means of this invention, taken along section lines 2—2 of FIG. 1.
Figure 3:
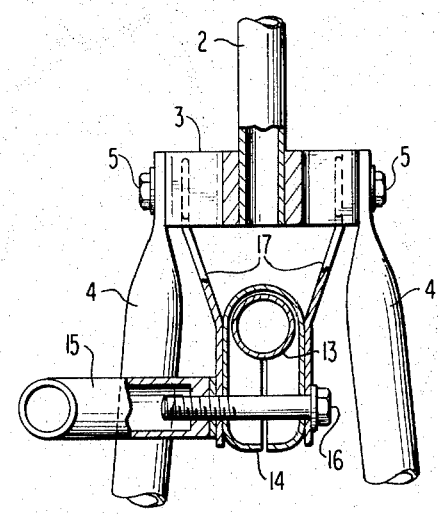
FIG. 3 is front partial sectional view of the seat mounting means of this invention, taken along section lines 3—3 of FIG. 1.

As shown in FIG. 1, 2 and 3 a seat may be mounted on a bicycle in such a manner as to provide longitudinal adjustment of the seat position. The seat 1 is fixed to a seat post 2, which, in turn, is fixed to a seat mounting carriage 3.

Vertical support for the seat 1 and the mounting carriage 3 is provided by the carriage supports 4 which define a parallel linkage. These supports 4 comprise two pairs of parallel members, one such pair being positioned on each side of the seat mounting carriage 3. The upper ends of these supports 4 are pivotally attached to seat mounting carriage 3 by pivotal attachments 5. The lower ends of these supports 4 are attached to the rear wheel supporting portions of the bicycle frame 6 at the frame mounting bars 7 by pivotal attachments 11. The frame mounting bars 7 are fixed, by weldments 8 or other suitable means, to the frame members 6 adjacent the rear wheel hub carrier 12.

To guide the seat carriage 3 in longitudinal movement, the bicycle frame 6 incorporates a horizontally extending cantilevered frame member 13, which may be attached to or integral with the bicycle frame 9. Seat positioning clamp 14 is releasably clamped about guiding member 13 by tightening seat positioning handle 15 on clamping fastener 16. This seat positioning clamp 14 connected to seat mounting carriage 3 by a lost motion linkage which includes the carriage attaching links 17. The links 17 are pivotally attached to seat carriage 3 at one end by either the front pair of the rear pair of pivotal attachments 5 and are pivotally attached at their opposite ends to the seat positioning clamp 14 by clamping fastener 16. The lost motion linkage permits the seat to move in a slight distance vertically relative to the guiding member 13 when the seat is adjusted longitudinally.

To reposition the seat mounted on a bicycle by the means of the invention, the seat positioning handle 15 is operated to release the clamping force of seat positioning clamp 14 on the horizontally extending guiding member 13. With this clamping force released, the clamp 14 may be moved forwardly or rearwardly along guide member 13. The seat mounting carriage 3 and seat 1 will thus be moved forwardly or rearwardly, as indicated by the dashed lines in FIG. 1, due to the connection of seat carriage 3 to positioning clamp 14 by carriage attaching links 17. When the seat is in the desired position, the clamp 14 may again be tightened by positioning handle 15, thus holding the seat in the desired position. The parallel pivoted supports 4 provide substantially all the vertical support for the weight of the rider and the seat 1 and provide stability for the seat mounting by maintaining the seat level and preventing the seat from rotating laterally about horizontal guiding member 13. Thus, since it is necessary for clamp 14 to provide support only against longitudinal movement of the seat carriage 3, the clamp 14 need not be clamped so tightly about the guiding member 13 as would a clamp supporting the considerably greater force of the weight of a rider. Consequently, the clamp 14 need only be tightened by hand and does not require the use of tools to achieve a satisfactorily rigid positioning. Since the clamp 14 and the guiding member 13 are not supporting any substantial portion of the vertical load from the rider and the seat 1, the clamp 14 may move sufficiently freely to permit adjusting the position of the seat 1 by the rider while he is riding the bicycle. This seat mounting means also provides for rearward placement of the seat such that the weight of the rider, and thus the center of gravity of the rider-vehicle combination, may be placed sufficiently rearwardly to enable the rider easily to raise the front wheel of the bicycle off the ground while riding or to perform other trick riding maneuvers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents falling within the scope of the invention are included.

What is claimed is:

1. In a velocipede having a frame with a rear wheel attached thereto by a pivotal connection and having a seat, seat mounting means comprising:

a seat mounting carriage carrying said seat and longitudinally movable with respect to said frame, carriage support means for supporting said carriage for said longitudinal movement, said carriage support means being pivotally attached to said carriage and to said frame adjacent said rear wheel pivotal connection so that the vertical load from said seat may be carried by said support means to said frame, carriage guide means attached to said frame, clamping means carried by said carriage and engaging said carriage guide means for guiding said carriage in said longitudinal movement and for releasably clamping said carriage at a preselected position along said guide means, and manual release means for releasing said clamping means.

2. The seat mounting means of claim 1 wherein said carriage support means further comprises pairs of parallel members located on opposite sides of said guide means, the lower end of each said member being pivotally attached to said frame by vertical load bearing connections and the upper end of each said member being pivotally attached to said carriage, whereby said support means supports said carriage against lateral rotation about said guide means and maintains said carriage in a horizontal position during longitudinal movement thereof.

3. The seat mounting means of claim 1 wherein said carriage further comprises lost motion means for attaching said clamping means to said carriage, said lost motion means comprising a member having one end pivotally attached to said carriage and having the opposite end pivotally attached to said clamping means, whereby said carriage may move vertically with respect to said guide means.

4. In a bicycle having a frame, a front wheel, a rear wheel attached to the frame and a seat, seat mounting means comprising:

a seat mounting carriage to which said seat is attached, said carriage being longitudinally movable with respect to said frame, carriage support means for supporting said carriage for said longitudinal movement, said support means comprising two pairs of parallel members, said pairs being located on opposite sides of said carriage and of said frame, the upper end of each said member being pivotally attached to said carriage and the lower end of each said member being pivotally attached to said frame adjacent to the attaching point of said rear wheel, so that any vertical load from said carriage and said seat may be carried by said support means to said frame, carriage guide means comprising a horizontally extending member attached to said frame, clamping means attached to said carriage and engaging said carriage guide means for guiding said carriage in said longitudinal movement and for releasably clamping said carriage at a preselected position along said guide means, carriage attaching linkage means for attaching said clamping means to said carriage, said attaching linkage comprising lost motion means having one end pivotally attached to said carriage and the opposite end pivotally attached to said clamping means, whereby said carriage is attached to and vertically movable with respect to said clamping means, and manual release means for releasing said clamping means.

5. A velocipede comprising a supporting frame having a rear wheel supporting portion adjacent a rear wheel, a substantially horizontal elongated seat guide member spaced above said rear wheel supporting portion, a seat positioned above said seat guide member, parallel linkage means pivotally connected to said seat and to said rear wheel supporting portion to transmit the load on said seat to said rear wheel supporting portion and to permit longitudinal movement of said seat while maintaining said seat horizontal, and manually operable clamping means releasably and slidably connecting said seat to seat guide means.

6. A velocipede according to claim 5 wherein said clamping means includes a lost motion linkage to permit relative vertical movement between said seat and said seat guide means during said longitudinal movement of said seat.

* * * * *